US012435197B2

(12) United States Patent
Butler et al.

(10) Patent No.: US 12,435,197 B2
(45) Date of Patent: Oct. 7, 2025

(54) PHENOLIC FOAM AND METHOD OF MANUFACTURE THEREOF (71) Applicant: KINGSPAN HOLDINGS (IRL) LIMITED, Cavan, County (IE)

(72) Inventors: Samuel Butler, Herefordshire (GB); Arno Verhoeven, Waalwijk (NL); Vincent Coppock, Cheshire (GB); Ruud Zeggelaar, Arnhem (NL)

(73) Assignee: KINGSPAN HOLDINGS (IRL) LIMITED, County Cavan (IE)

( * ) Notice: Subject to any disclaimer, the term of this patent is extended or adjusted under 35 U.S.C. 154(b) by 569 days.

(21) Appl. No.: 17/794,461

(22) PCT Filed: Jan. 26, 2021

(86) PCT No.: PCT/EP2021/051769
§ 371 (c)(1),
(2) Date: Jul. 21, 2022

(87) PCT Pub. No.: WO2021/151900
PCT Pub. Date: Aug. 5, 2021

(65) Prior Publication Data
US 2023/0079015 A1 Mar. 16, 2023

(30) Foreign Application Priority Data
Jan. 27, 2020 (GB) ...................... 2001120

(51) Int. Cl.
*C08J 9/14* (2006.01)
*C08G 8/10* (2006.01)

(52) U.S. Cl.
CPC ................ *C08J 9/149* (2013.01); *C08G 8/10* (2013.01); *C08J 2203/202* (2013.01); *C08J 2205/052* (2013.01); *C08J 2361/10* (2013.01)

(58) Field of Classification Search
CPC ........................... C08J 9/149; C08J 2203/202; C08J 2205/052; C08J 2361/10; C08J 2203/162; C08J 9/143; C08J 9/146; C08J 9/141; C08J 9/144; C08J 9/145; C08G 8/10; C08L 61/04; C08L 61/06; C08L 61/12
See application file for complete search history.

(56) References Cited

U.S. PATENT DOCUMENTS

2016/0326331 A1 11/2016 Hamajima et al.
2017/0009037 A1* 1/2017 Hamajima .............. B29C 39/00

FOREIGN PATENT DOCUMENTS

EP 3275927 A1 1/2018

OTHER PUBLICATIONS

International Search Report Issued in PCT/EP2021/051769, mailed Mar. 24, 2021; ISA/EP.

* cited by examiner

Primary Examiner — K. Boyle
(74) Attorney, Agent, or Firm — Harness, Dickey & Pierce, P.L.C.

(57) ABSTRACT

A phenolic foam and method for manufacturing same are described herein. The foam comprises at least on chlorinated hydrofluoroolefin, at least one hydrofluoroolefin and at least one hydrocarbon. The foam has excellent thermal insulation performance and excellent fire performance.

20 Claims, 4 Drawing Sheets

PHENOLIC FOAM AND METHOD OF MANUFACTURE THEREOF

CROSS-REFERENCE TO RELATED APPLICATIONS

This application is a 371 U.S. National Phase of International Application No. PCT/EP2021/051769, filed Jan. 26, 2021, which claims priority to GB Application No. 2001120.1, filed Jan. 27, 2020. The entire disclosures of the above applications are incorporated herein by reference.

FIELD

The present invention relates to phenolic foams and methods of manufacture thereof. The phenolic foams of the present invention have excellent reaction and resistance to fire performance in combination with excellent thermal insulation performance.

BACKGROUND

The Paris Agreement aims to keep the increase in global average temperatures to below 2° C. above pre-industrial levels. Reducing energy consumption is vital to achieve this goal. The construction of energy efficient buildings, and retrofitting existing buildings to make them energy efficient is necessary to decrease the energy required to maintain such buildings. Thermal insulation materials are key to reducing the energy consumption requirements of buildings.

A wide variety of thermal insulation materials are commercially available for a myriad of applications including roofing systems, building panels, building facades, flooring systems and cold storage applications. The selection of the most appropriate type of insulation product for a given application involves assessment of a number of criteria, for example, insulation properties (i.e. thermal conductivity), compressive strength, dimensional stability, water resistance, fire performance, thickness of the insulation product, and expected lifetime of the insulation product. For example, vacuum insulation panels have excellent thermal insulation performance and a lifetime of up to about 20 years, however, generally speaking they are not very robust, and if the outer envelope is perforated, their insulation ability is significantly reduced. Accordingly, they are used in cold storage applications such as refrigerators, where they are protected from perforation by a refrigeration unit liner. The use of vacuum insulation panels in other applications where the risk of perforation is greater—during installation and/or in use—such as in cavity walls is less common.

Wrapping a building in a building envelope, or facade is an efficient way to protect the building from the elements, to insulate the building, and such building methodology affords significant scope for design expression.

Accordingly, using insulation materials having excellent fire performance is highly advisable in building façades. Desirably, the insulation products in building facades should combine excellent thermal insulation performance with excellent fire performance.

Aerogels are materials that combine good fire performance with excellent insulating properties. However, the cost of these products is currently relatively high and therefore the widespread use of aerogels, particularly in building applications, is not currently commercially viable.

Man-made mineral wool (MMMW) insulation materials have excellent fire performance, however, closed cell polymeric foams have superior thermal insulation performance. Consequently in order to achieve a given U-value, the thickness of a MMMW insulation product, will usually be significantly greater than that of a closed cell polymeric foam.

Closed cell insulation materials like polyurethane/polyisocyanurate (PUR/PIR), extruded polystyrene (XPS) and phenolic foams (PF) offer superior insulation values in comparison to MMMW. Closed cell polymeric foams are formed by expanding a blowing agent, which generally has a low thermal conductivity, in a polymeric resin or pre-polymeric reactants which will react to form a polymeric resin. The foam cells contain the blowing agent, whose low thermal conductivity imparts excellent insulating properties to the foam. The closed cell structure of the foam ensures these gases cannot escape from the product.

Figure 1:
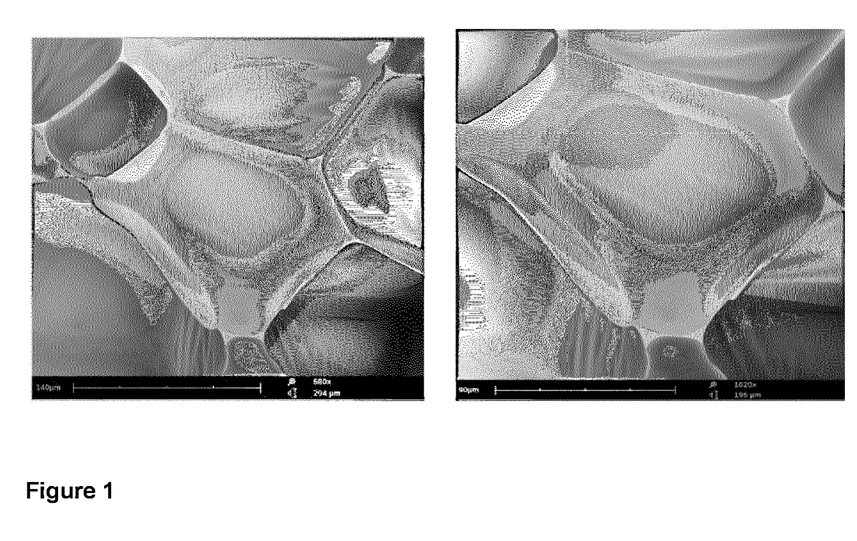
FIG. 1 shows a scanning electron micrograph of a closed cell phenolic foam.

A scanning electron microscopy photograph of a typical closed cell structure of a phenolic foam is shown in FIG. 1.

Historically, phenolic resins have been the preferred thermosetting resins to use for foam insulation requiring low toxicity, low smoke emission and self-extinguishing capability in a fire situation. Phenolic foams are known to combine excellent fire performance with superior thermal insulation values at a commercially viable cost price, without requiring flame retardants additives which may be deleterious in terms of toxicity. In contrast, foams such as PIR or XPS have inferior fire performance which precludes their use in certain applications, and in order to meet minimum fire performance standards in other applications, the use of significant levels of flame retardants are required.

While improved fire performance can be achieved by using flame retardants, the use of flame retardants is sometimes not preferred.

The most important chemical families of flame retardants are those based on bromine, chlorine, phosphorous, nitrogen, antimony, certain metal salts and hydrates of inorganic hydroxides.

A flame retardant should inhibit or even suppress the combustion process. Flame retardants can act chemically and/or physically in the solid, liquid or gas phase. They interfere with combustion during a particular stage of the burning process, e.g. during heating, ignition, flame spread, or decomposition of a material.

For flame retardants to be effective in the very early stage of a fire, they need to be active in the gas phase. Such flame retardants interrupt chemical free radical formation mechanisms of the combustion process which may take place in the gas phase. The exothermic decomposition processes are thus stopped or reduced, the foam system cools, and the supply of flammable gases is reduced and is eventually completely suppressed.

As blowing agent (which may be flammable) may be released from foam cells at a temperature in excess of the blowing agent boiling point temperature for example at 100° C. or higher, flame retardants need to function around this temperature also. Some flame retardants, for example, aluminium trihydrate, have higher decomposition temperatures at which they release their water of hydration content, and as such the flammable blowing agent will be released before the flame retardancy effect of the flame retardant can be effected. For this reason, such a flame retardant will have only a limited effect in reducing the spread of the flames and the reaction to fire.

Many common flame retardants are brominated compounds. Some brominated products can have a negative environmental and health impact, and are now being phased out by various environmental initiatives worldwide. Accordingly, it would be desirable to have alternative insulation products which have excellent insulation performance and fire performance which do not require the use of such brominated flame retardants.

Figure 2:
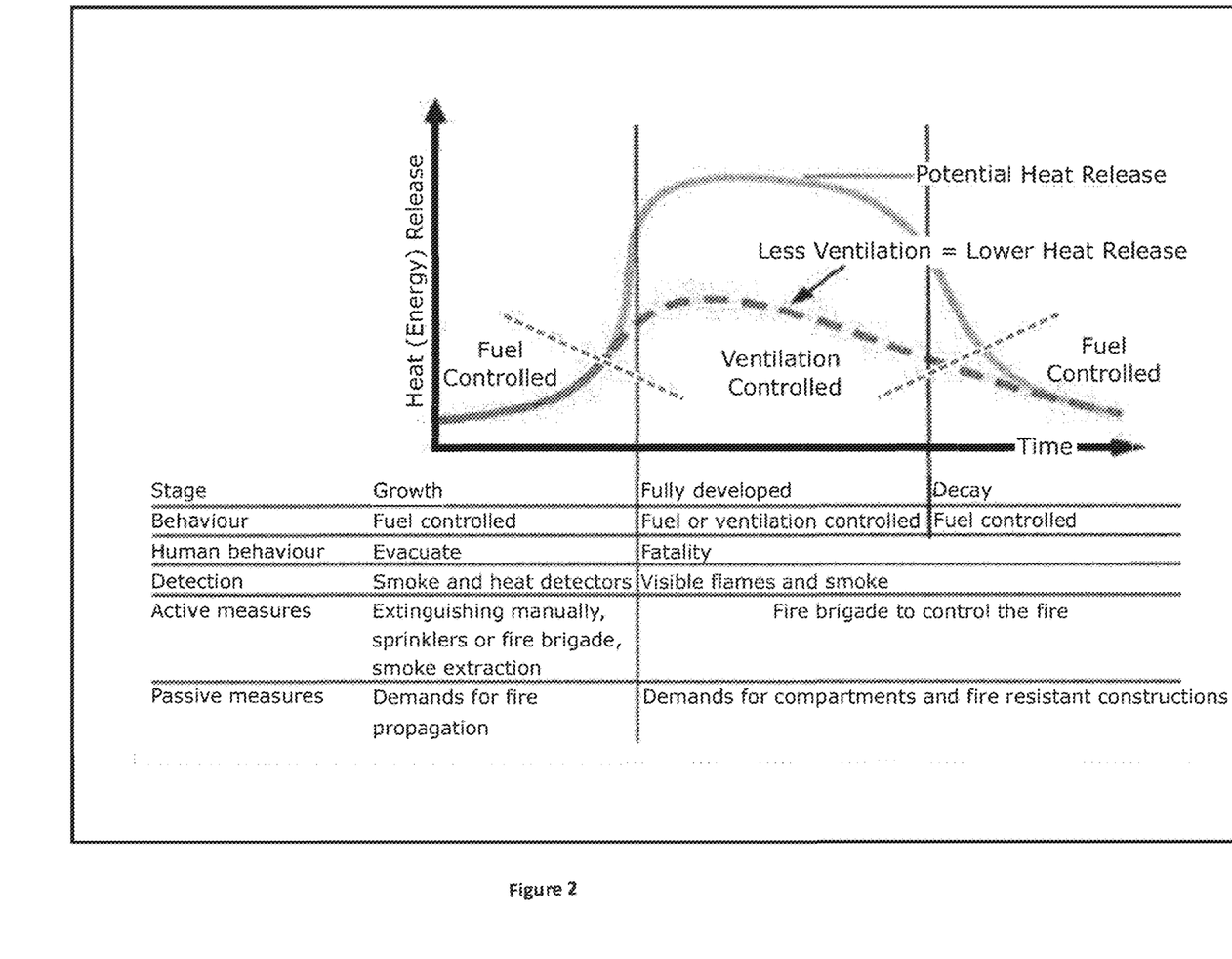
FIG. 2 shows heat release development as a function of time in a real fire situation.

FIG. 2 shows heat release development as a function of time in a real fire situation. The risk of casualties in a fire can be reduced if the initial area where heat release is fuel controlled can be extended. In the case of buildings comprising façades, the façade construction and the materials used therein, can significantly impact fire growth.

To determine the fire performance of insulation materials, a wide range of fire tests have been developed. The main issue with these tests is that there is limited correlation between the performances of a material in many of these fire tests with the actual fire performance of the material in a real fire. The main reason is that the intensity of the heat is very difficult to simulate on a smaller scale. Examples of standardized small scale fire tests include EN13823, ISO 13785-1, ISO 21367 and PN-B-02867. Standardized large scale fire tests include DIN 4102-20, ISO 9705, SP105, BS8414-1, MSZ 14800-6, LePIR-II, JIS A 1310 and NFPA 285.

The fire behaviour of a closed cell insulation material can be categorized into two categories, namely: "reaction to fire" and "resistance to fire". The first category is an indicator of the rate at which a fire spreads after a material is ignited by a heat source. The second category indicates the resistance against fire propagation through the foam insulation material.

When a closed cell foam is exposed to a heat source, the temperature of the gas inside the foam cells will increase. As the temperature increases, the volume of the gas increases leading to increased pressure in the cells and ultimately, the cell walls will rupture with the release of the cell gas.

When the blowing agent in the cell gas is flammable, the gas released from the product will ignite and generate heat. This effect can accelerate the spread of a fire, reducing the time between the initial ignition and the full development of the fire.

The rupture of the cell walls can start to occur at temperatures of above about 100° C., causing the formation of combustible decomposition gases from the chemical foam matrix.

The release of flammable blowing agent, and its subsequent combustion increases the temperature of the foam matrix, and accelerates its decomposition. This results in an increased rate of fire propagation.

Polyurethane, polyisocyanurate and phenolic laminate foams are generally manufactured with a surface protection layer called a facer. Fire resistant facers can delay the release of cell gas in the very early stages of a fire. Gas tight facers which are applied to a foam core are particularly efficacious at protecting the foam core in a fire. Examples of gas tight facers include (unperforated) aluminium foil and steel sheet facers.

For polyisocyanurate foams for example, aluminium foils with a thickness of around 30 microns (in some cases even up to 200 microns) may be used as facers on polyisocyanurate foam cores, to improve the fire performance of the insulation product.

For phenolic foams however these gas tight facers are not generally used in the production process, because water which is generated during the phenolic resin condensation polymerization process needs to be removed, to avoid the formation of voids in the foam matrix. A gas tight facer which is applied during foam manufacture would prevent such water removal. Gas tight facers can be applied to a phenolic foam after the water is removed in the production process, by secondary bonding but this is cost inefficient.

In many fire performance standard test methods, products are tested without removal of the facer. However, the use of a facer will only help to prevent the spread of the fire in the case of a limited heat/ignition source, for example a trash can which has caught fire. The ability of a facer to prevent or stem the spread of a more developed fire is limited. In relation to the resistance to fire, facers will not offer protection because an aluminium foil will burn away in a matter of seconds.

The presence of the facer on a polymeric foam can skew the outcome of the performance of the foam in a small scale fire test, to an extent which does not translate to the performance of the foam in a large scale test. Accordingly, the most realistic approach which simulates a foam insulation product's performance in an actual fire, is to test the foam core instead of the complete insulation product which includes the facer. The most reliable approach to obtain a realistic assessment of the performance of an insulation product including the facer is probably to conduct a large scale fire test. The disadvantage of these large scale fire tests is that they are very expensive, and conducting such tests is time consuming. Furthermore, there is a limited availability of suitable test rigs for carrying out such tests.

A wide variety of small scale and large scale fire tests are being used to simulate actual fire performance.

Examples of laboratory fire tests are the "Cone calorimeter Heat Release test" (ISO 5660-1), the "Limiting Oxygen Index" (LOI) test (ISO 4589-2), the "Heat of Combustion" test (ISO 1716) and the "Ignitability of Products Subjected to Direct Impingement of Flame test" (ISO 11925-2).

The problem with the majority of these laboratory scale fire tests is there is a very limited correlation with the fire performance of a material tested in such a laboratory test, to its actual fire performance in a large scale fire test, or indeed in a real fire situation. First of all, in some of these experiments, the product is not exposed to a flame but to an alternative heat source. Secondly the power of the heat source is much lower compared to an actual fire situation.

For example, in test method EN ISO 11925-2, "Reaction to fire tests—Ignitability of building products subjected to direct impingement of flame—Part 2: Single-flame source test", the product to be tested is exposed to a small flame that is comparable to a cigarette lighter flame. The foam, facer and edges of the insulation product are exposed to this flame for 15 to 30 seconds. The flame height should be smaller or equal to 150 mm. Due to the small flame used in this test, the correspondence with the product's performance in an actual fire situation is limited.

In the Limiting Oxygen Index test (LOI) ISO 4589-2, a small test sample is supported in a vertical glass column and a slow stream of known composition oxygen/nitrogen mixture is introduced into the glass column. The upper end of the sample is ignited and the specimen is observed for the duration of the burning and the burn length of the specimen is noted. The calibrated mixture of oxygen and nitrogen is varied and the test is continued with additional specimens until the minimum concentration of oxygen (as a percentage) that will just support combustion is found. The higher the LOI, the lower the flammability. Air contains approximately 21% oxygen and therefore any material with an LOI of less than 21% will probably support burning in an open-air situation.

The LOI value is a basic property of the material but provides insufficient information about how the material will actually react to burning in an open atmosphere. The LOI test has no direct relationship with an actual fire where materials ignite. The LOI test only studies extinguishing behaviour in an oxygen rich (or deficient) gas mixture with nitrogen.

Notwithstanding the foregoing, large scale fire testing and some small scale fire tests such as EN13823, ISO 13785-1, ISO 21367 and PN-B-02867 provide much more reliable information with respect to the fire performance of a product in a real fire situation.

A particularly useful evaluation method to assess the fire performance of an insulation material in a real fire situation is the Single Burning Item (SBI) test (EN13823).

This test method involves measuring flame spread length, average rate of heat release ($HRR_{av}$), total heat release (THR) after "t" seconds, propensity to produce flaming drips and the rate of smoke production (SPR). The test procedure simulates the performance of insulation products fixed to the walls and ceiling of a small room where the single burning ignition source in the corner of the room is a nominal 30 kW heat output. The burner is comparable to a waste-paper basket on fire in the corner of a room. Accordingly, EN13823 is a test method which simulates a real fire situation and thus provides very useful information regarding the fire performance of an insulation material in a real fire situation.

The performance of the specimen is evaluated for an exposure period of 20 minutes. During the test, the heat release rate (HRR) is measured by using oxygen consumption calorimetry. The smoke production rate (SPR) is measured in the exhaust duct based on the attenuation of light. The fall of flaming droplets or particles is visually observed during the first 600 seconds of the heat exposure on the specimen. Lateral flame spread is also measured.

The fire performance of a material is assessed in EN13823 by monitoring the rate of fire growth and the rate of smoke production after threshold values for the average heat release rate, total heat release rate, average smoke production rate and total smoke production rate have been exceeded beyond defined reference values in the specification.

The fire performance classification parameters of the SBI test are fire growth rate index (FIGRA), lateral flame spread (LFS), and total heat release at 600 seconds ($THR_{600\ s}$). Additional classification parameters are defined for smoke production as smoke growth rate index (SMOGRA) and total smoke production at 600 seconds ($TSP_{600s}$), and for flaming droplets and particles according to their occurrence during the first 600 seconds of the test.

The performance of closed cell thermal insulation foams in the SBI test varies considerably, depending inter alia on the chemical type of foam resin being tested, the type of blowing agent retained in the foam and the presence or absence of flame retardants.

The Euroclass system for evaluation of the fire performance of building materials involves the classification of building materials into seven classes based on their reaction-to-fire properties. The classes are as follows: A1, A2, B, C, D, E and F. The Euroclass system classifies the fire performance of materials based on their performance in several standard test methods including: EN ISO 11925-2; EN13823; EN ISO 1716 and EN ISO 1182. Products in the Euroclass "A" classes include inorganic and ceramic products with little or no organic material. Examples of products in the Euroclass B class include gypsum boards with thin facing materials. The classification of closed cell insulation products varies depending on the nature of the organic polymer resin from which the foam is formed, the type of blowing agent and the presence or absence of flame retardants. As outlined above, the phenolic resin matrix of a phenolic foam is inherently less flammable than the resin matrices in polystyrene, polyurethane or polyisocyanurate foams. While achieving Euroclass "A" classification for closed cell foams formed from thermoset or thermoplastic resins is not possible, it would be desirable to provide closed cell foams achieving Euroclass "B" or as a minimum Euroclass "C" classification, which also deliver excellent thermal insulation performance. These and other desires are solved by the present invention.

SUMMARY OF THE INVENTION

In one aspect, the present invention provides a phenolic foam comprising a phenolic resin comprising a plurality of cells, said cells comprising a blowing agent comprising:

at least one hydrofluoroolefin and at least one chlorinated hydrofluoroolefin;

said blowing agent further comprising at least one $C_3$-$C_6$ hydrocarbon;

wherein said phenolic foam has a density of from 10 kg/m$^3$ to 100 kg/m$^3$, a closed cell content of at least 85% as determined in accordance with ASTM D6226 and wherein said foam has a $FIGRA_{0.2\ MJ}$ of 150 W/s or less, when measured according to EN13823.

In another aspect the present invention provides a phenolic resin comprising a plurality of cells, said cells comprising a blowing agent comprising at least one chlorinated hydrofluoroolefin and at least one hydrofluoroolefin;

said blowing agent further comprising at least one $C_3$-$C_6$ hydrocarbon, wherein said phenolic foam has a density of from 10 kg/m$^3$ to 100 kg/m$^3$, a closed cell content of at least 85% as determined in accordance with ASTM D6226 and wherein said foam has a $FIGRA_{0.4\ MJ}$ of 80 W/s or less, when measured according to EN13823.

Suitably said foam has a $FIGRA_{0.2\ MJ}$ of 125 W/s or less, such as 120 W/s or less, or 110 W/s or less, or 100 W/s or less, or 95 W/s or less, or 90 W/s or less, or 85 W/s or less, when measured according to EN13823.

Suitably, a foam of the present invention has a $FIGRA_{0.4\ MJ}$ of 80 W/s or less, such as 75 W/s or less, or 65 W/s or less, or 60 W/s or less, or 55 W/s or less, when measured according to EN13823.

Desirably, a foam of the present invention has a $FIGRA_{0.2\ MJ}$ of 150 W/s or less, and a $FIGRA_{0.4\ MJ}$ of 80 W/s or less when measured according to EN13823. Suitably, the foam has a $FIGRA_{0.2\ MJ}$ of 125 W/s or less, and a $FIGRA_{0.4\ MJ}$ of 75 W/s or less when measured according to EN13823.

The foam may have a total heat release of 7.5 MJ or less, such as 7.0 MJ or less, or 6.5 MJ or less, or 6.25 MJ or less, or 6.0 MJ or less, or 5.75 MJ or less, or 5.5 MJ or less, or 5.25 MJ or less, or 5.15 MJ or less, or 5.0 MJ or less, or 4.8 MJ or less, or 4.6 MJ or less, or 4.4 MJ or less, when measured according to EN13823.

The foam desirably has a closed cell content of 90% or more, such as 95% or more, preferably 98% or more, as determined in accordance with ASTM D6226.

The cells of the foam may have an average cell diameter in the range of from 50 to 250 μm, such as in the range of from 80 to 180 μm.

Suitably, each of the at least one hydrofluoroolefin and the at least one chlorinated hydrofluoroolefin have a thermal conductivity of 0.0125 W/m·K or less. For example, each of the at least one hydrofluoroolefin and the at least one chlorinated hydrofluoroolefin have a thermal conductivity of 0.0125 W/m·K or less at 25° C.

Suitably, the foam has a thermal conductivity of 0.020 W/m·K or less, suitably of 0.018 W/m·K or less, desirably 0.0175 W/m·K or less, or 0.0170 W/m·K or less, or 0.0165 W/m·K or less, or 0.0162 W/m·K or less when measured at a mean temperature of 10° C., in accordance with EN 13166:2012.

The foam may have a limiting oxygen index of 34% or more, preferably 35% or more, suitable 36% or more, such as 37% or more as determined in accordance with ISO 4589-2.

Suitably, the foam has a stable moisture content of from 3% to 5% by weight added when determined at 23 (±2°) C. and a relative humidity of 50 (±5)% in accordance with EN12429:1998—Thermal insulating products for building applications: conditioning to moisture equilibrium under specified temperature and humidity conditions.

The at least one chlorinated hydrofluoroolefin may be selected from 1-chloro-3,3,3-trifluoropropene (HCFO-1233zd) and 1-chloro-2,3,3,3-tetrafluoropropene (HCFO-1224yd).

The HCFO-1233zd may be the E or Z isomer, or a mixture thereof, i.e. the HCFO-1233zd may be HCFO-1233zd(E), HFCO-1233zd(Z) or a mixture thereof. For example, the HCFO-1233zd may comprise 90 wt % or more (such as 95 wt % or more) HCFO-1233zd(E), or the HCFO-1233zd may comprise 90 wt % or more (such as 95 wt % or more) HCFO-1233zd(Z). Desirably, the HCFO-1233zd comprises 95 wt % or more HCFO-1233zd(E).

The HCFO-1224yd may be the E or Z isomer, or a mixture thereof, i.e. the HCFO-1224yd may be HCFO-1224yd(E), HFCO-1224zd(Z) or a mixture thereof. For example, the HCFO-1224yd may comprise 90 wt % or more (such as 95 wt % or more) HCFO-1224yd(E), or the HCFO-1224yd may comprise 90 wt % or more (such as 95 wt % or more) HCFO-1224yd(Z). Desirably, the HCFO-1224yd comprises 95 wt % or more HCFO-1224yd(Z).

The at least one hydrofluoroolefin desirably comprises 1,1,1,4,4,4-hexafluoro-2-butene (HFO-1336mzz). The HFO-1336mzz may be the E or Z isomer, or a mixture thereof, i.e. the HFO-1336mzz may be HFO-1336mzz(E), HFO-1336mzz(Z) or a mixture thereof. For example, the HFO-1336mzz may comprise 90 wt % or more (such as 95 wt % or more) HFO-1336mzz(E), or the HFO-1336mzz may comprise 90 wt % or more (such as 95 wt % or more) HFO-1336mzz(Z). Desirably, the HFO-1336mzz comprises 95 wt % or more HFO-1336mzz(Z).

The at least one $C_3$-$C_6$ hydrocarbon may comprise butane, for example isobutane, and/or pentane, desirably isopentane. The at least one $C_3$-$C_6$ hydrocarbon may be unsaturated for example butene, pentene such as isopentene.

Suitably, the at least one hydrofluoroolefin and at least one chlorinated hydrofluoroolefin, and the at least one $C_3$-$C_6$ hydrocarbon are blended. For example, the blowing agent components i.e. the at least one hydrofluoroolefin, the at least one chlorinated hydrofluoroolefin, and the at least one $C_3$-$C_6$ hydrocarbon may be blended prior to being mixed with the phenolic resin.

In another aspect the present invention provides a phenolic foam formed by foaming and curing a phenolic resin foamable composition comprising a phenolic resin, a surfactant, an acid catalyst, and a blowing agent,
said blowing agent comprising:
at least one chlorinated hydrofluoroolefin and at least one hydrofluoroolefin,
said blowing agent further comprising at least one $C_3$-$C_6$ hydrocarbon;
wherein said phenolic foam has a density of from 10 kg/m³ to 100 kg/m³, a closed cell content of at least 85% as determined in accordance with ASTM D6226 and wherein said foam has a $FIGRA_{0.2\ MJ}$ of 150 W/s or less (preferably 125 W/s or less, 120 W/s or less, or 110 W/s or less, or 100 W/s or less, or 95 W/s or less, or 90 W/s or less, or 85 W/s or less) when measured according to EN13823.

Suitably, said foam has a $FIGRA_{0.4\ MJ}$ of 80 W/s or less, such as 75 W/s or less, or 65 W/s or less, or 60 W/s or less, or 55 W/s or less, when measured according to EN13823.

The at least one chlorinated hydrofluoroolefin may comprise 1-chloro-3,3,3-trifluoropropene (HCFO-1233zd) and/or 1-chloro-2,3,3,3-tetrafluoropropene (HCFO-1224yd).

The at least one hydrofluoroolefin may comprise 1,1,1,4,4,4-hexafluoro-2-butene (HFO-1336mzz).

The at least one $C_3$-$C_6$ hydrocarbon may comprise butane, preferably isobutane, and/or pentane, preferably isopentane. The at least one $C_3$-$C_6$ hydrocarbon may be unsaturated for example butene, pentene such as isopentene Suitably, the blowing agent comprises 1-chloro-3,3,3-trifluoropropene and/or 1-chloro-2,3,3,3-tetrafluoropropene and 1,1,1,4,4,4-hexafluoro-2-butene.

The phenolic resin suitably has a weight average molecular weight of from about 700 to about 2000, and/or wherein the phenolic resin has a number average molecular weight of from about 330 to about 800, such as from about 350 to about 700.

Suitably, the phenolic resin has a molar ratio of phenol groups to aldehyde groups, for example for a monofunctional aldehyde, in the range of from about 1:1 to about 1:3, suitably from about 1:1.5 to about 1:2.3. The phenol may be a substituted phenol such as cresol. Naturally occurring phenols may be used including naturally occurring phenolic macromolecules. Other aldehydes may be used including dialdehydes such as glyoxal. The molar ratio above may be adjusted to take account of aldehyde functionality.

The water content of the phenolic resin foamable composition may be in the range of from about from 5 wt % to 12 wt %, such as from 5 wt % to 10 wt %, for example 7 to 10 wt % based on the total weight of the phenolic resin foamable composition.

The phenolic resin used to form the phenolic resin foamable composition of the present invention, may have a water content in the range of from about 10 wt % to about 14 wt % i.e. in its uncured state, the phenolic resin has a water content in the range of from about 10 wt % to about 14 wt %.

The phenolic resin may have a viscosity of from about 2,500 mPa·s to about 18,000 mPa·s when measured at 25° C., such as from about 3500 mPa·s to about 16,000 mPa·s when measured at 25° C. for example from about 4,000 mPa·s to about 8,000 mPa·s when measured at 25° C.

The blowing agent is suitably present in an amount of from about 5 to about 20 parts by weight per 100 parts by weight of the phenolic resin.

The foam may have a compressive strength in the range of from about 95 kPa to about 200 kPa as determined in accordance with EN826.

The foam suitably has a density of from about 15 kg/m³ to about 60 kg/m³, such as from about 20 kg/m³ to about 50 kg/m³, suitably of from about 24 kg/m³ to about 48 kg/m³.

In yet a further aspect the present invention provides a method for manufacturing a phenolic resin foam comprising foaming and curing a phenolic resin foamable composition comprising a phenolic resin, a surfactant, an acid catalyst, and a blowing agent, said blowing agent comprising at least one chlorinated hydrofluoroolefin and at least one hydrofluoroolefin said blowing agent further comprising at least one $C_3$-$C_6$ hydrocarbon; to form a phenolic resin foam having a density in the range of from 10 kg/m³ to 100 kg/m³, a closed cell content of at least 85% as determined in accordance with ASTM D6226, and a FIGRA$_{0.2\ MJ}$ of 150 W/s or less, when measured according to EN 13823.

In still a further aspect, the present invention provides a composition comprising:

at least one chlorinated hydrofluoroolefin selected from HCFO-1233zd and HCFO-1224yd, a hydrofluoroolefin, wherein the hydrofluoroolefin is HFO-1336mzz; and a hydrocarbon, wherein the hydrocarbon is isopentane;

wherein said at least one chlorinated hydrofluoroolefin is present in an amount of about 72 wt % to about 92 wt %, the HFO-1336mzz is present in an amount of from about 5 wt % to about 15 wt %; and the isopentane is present in an amount of from about 4 wt % to about 25% such as about 20 wt % based on the total weight of the composition.

Suitably, the at least one chlorinated hydrofluoroolefin is present in an amount of from about 72 wt % to about 82 wt % based on the total weight of the composition.

Suitably, the HFO-1336mzz is present in an amount of from about 8 wt % to about 14 wt % based on the total weight of the composition.

Suitably, the isopentane is present in an amount of from about 8 wt % to about 18 wt % based on the total weight of the composition.

Preferably, the at least one chlorinated hydrofluoroolefin is present in an amount of from about 72 wt % to about 82 wt %, the HFO-1336mzz is present in an amount of from about 8 wt % to about 14 wt %, and the isopentane is present in an amount of from about 8 wt % to about 18 wt % based on the total weight of the composition.

Advantageously, the composition of the invention may be used as a blowing agent to form thermal insulation foam having improved fire performance properties.

The present invention also provides for a foamable composition comprising a polymeric resin or pre-polymer and the composition described herein.

DEFINITIONS

The phrase "at least one X selected from the group consisting of A, B, C and combinations thereof" is defined such that X includes: "at least one A" or "at least one B" or "at least one C", or "at least one A in combination with at least one B", or "at least one A in combination with at least one C" or "at least one B in combination with at least one C" or "at least one A in combination with at least one B and at least one C".

The phrase "Y may be selected from A, B, C and combinations thereof" implies Y may be A, or B, or C, or A+B, or A+C, or B+C, or A+B+C.

The term "blowing agent" is defined as the propelling agent employed to blow the foamable composition for forming a foam. For example, a blowing agent may be employed to blow/expand a resin to form a foam.

Properties

Suitable testing methods for measuring the physical properties of phenolic foam are described below.

(i) Foam Density:

This was measured according to BS EN 1602:2013—Thermal insulating products for building applications—Determination of the apparent density.

(ii) Thermal Conductivity:

A foam test piece of length 300 mm and width 300 mm was placed between a high temperature plate at 20° C. and a low temperature plate at 0° C. in a thermal conductivity test instrument (LaserComp Type FOX314/ASF, Inventech Benelux BV). The thermal conductivity (TC) of the test pieces was measured according to EN 12667: "Thermal performance of building materials and products—Determination of thermal resistance by means of guarded hot plate and heat flow meter methods, Products of high and medium thermal resistance".

(iii) Thermal Conductivity after Accelerated Ageing:

This was measured using European Standard BS EN 13166: 2012—"Thermal insulation products for buildings—Factory made products of phenolic foam (PF)"—Specification Annex C section 4.2.3. The thermal conductivity is measured after exposing foam samples for 25 weeks at 70° C. and stabilisation to constant weight at 23° C. and 50% relative humidity. This thermal ageing serves to provide an estimated thermal conductivity for a time period of 25 years at ambient temperature. Alternatively, aged thermal conductivity may be measured after exposing foam samples for 2 weeks at 110° C. and stabilisation to constant weight at 23° C. and 50% relative humidity.

(iv) pH:

The pH was determined according to the standard BS EN 13468.

(v) Closed Cell Content:

The closed cell content may be determined using gas pycnometry. Suitably, closed cell content may be determined according to ASTM D6226 test method.

(vi) Friability:

Friability is measured according test method ASTM C421-08(2014).

(vii) Imaging Cells

A piece of foam was roughly cut measuring approximately 20 mm×10 mm from one coated surface to the other. From this piece the surfaces were trimmed with a razor blade to approximately 8 mm square. The foam was then snapped sharply to reveal a clean surface and the majority of the sample was removed to leave a thin (~1 mm) slice.

The slice was fixed onto an aluminium sample stub using a double sided conducting sticky tab.

The samples were then given a thin (~2.5 Angstroms) conducting coat of gold/palladium using a Bio-Rad SC500 sputter coater. The reason for coating the sample is (a) to add a conducting surface to carry the electron charge away and (b) to increase the density to give a more intense image. At the magnifications involved in this study the effect of the coating is negligible.

The samples were imaged using an FEI XL30 ESEM FEG Scanning Electron Microscope under the following conditions: 10 kV accelerating voltage, working distance ~10 mm, spot size 4, and Secondary Electron Detector. Images were saved at the following magnifications ×350, ×1200 and ×5000 and saved as .tiff files to disc. The images at ×350 show the general size distribution of the cells and higher magnifications at ×1200 and ×5000 show the nature of the cell surfaces.

Images acquired at ×350 magnification for both samples typically show a size range of ~100 to 200 microns. In the preparation of the foam samples for evaluation by electron microscopy, the manual snapping of the foam sample—to create a surface to examine—can induce some damage at the cell walls.

The images collected at ×1200 and ×5000 magnification are substantially free of defects and holes.

(viii) Average Cell Diameter

A flat section of foam is obtained by slicing through the middle section of the thickness of the foam board in a direction running parallel to the top and bottom faces of a foam board. A 50-fold enlarged photocopy is taken of the cut cross section of the foam. Four straight lines of length 9 cm are drawn on to the photocopy. The number of cells present on every line is counted and the average number cell number determined according to JIS K6402 test method. The average cell diameter is taken as 1800 µm divided by this average number.

(ix) Viscosity

The viscosity of a resin employed in the manufacture of a foam of the present invention may be determined by methods known to the person skilled in the art for example using a Brookfield viscometer (model DV-II+Pro) with a controlled temperature water bath, maintaining the sample temperature at 25° C., with spindle number S29 rotating at 20 rpm or appropriate rotation speed and spindle type or suitable test temperature to maintain an acceptable mid-range torque for viscosity reading accuracy.

(x) % Water Content of Phenolic Resin

To dehydrated methanol (manufactured by Honeywell Specialty Chemicals), the phenol resin was dissolved in the range of 25% by mass to 75% by mass. The water content of the phenol resin was calculated from the water amount measured for this solution. The instrument used for measurement was a Metrohm 870 KF Titrino Plus. For the measurement of the water amount, Hydranal™ Composite 5, manufactured by Honeywell Specialty Chemicals was used as the Karl-Fischer reagent, and Hydranal™ Methanol Rapid, manufactured by Honeywell Specialty Chemicals, was used for the Karl-Fischer titration. For measurement of the titre of the Karl-Fischer reagent, Hydranal™ Water Standard 10.0, manufactured by Honeywell Specialty Chemicals, was used. The water amount measured was determined by method KFT IPol, and the titre of the Karl-Fischer reagent was determined by method Titer IPol, set in the apparatus.

(xi) Fire Performance; Mass Loss Cone calorimeter Tests

The total heat release rate and the peak rate of heat release of foams is measured by subjecting the foams to a particular heat flux for a particular duration. The mass loss cone calorimeter instrument is supplied from FTT in the UK. For the tests here a heat flux of 50 KW was used over a time period of 15 minutes maximum. Cone heater calibration followed a procedure from EN ISO 13927.2015 section 9. A heat flux of 50 KW was used in the test giving a cone temperature of 760° C.

Foam samples with their facings present were prepared for testing as described in EN ISO13927.2015 Section 8.

Mass loss cone calorimetry was undertaken on 50 mm thickness phenolic foam boards with 70 g/m² glass mat facings adhered to both the bottom and top foam surfaces. Boards were all closed cell (>90%), with lambda values between 0.0172 and 0.0182 W/m·K. Examples of the fire performance of phenolic foam boards with combinations of different blowing agent combinations of HCFO, HFO and HC (hydrocarbon) tested according EN13927.2015 are given in Table 7.

(xii) Fire Performance: Single Burning Item Test

Figure 3:
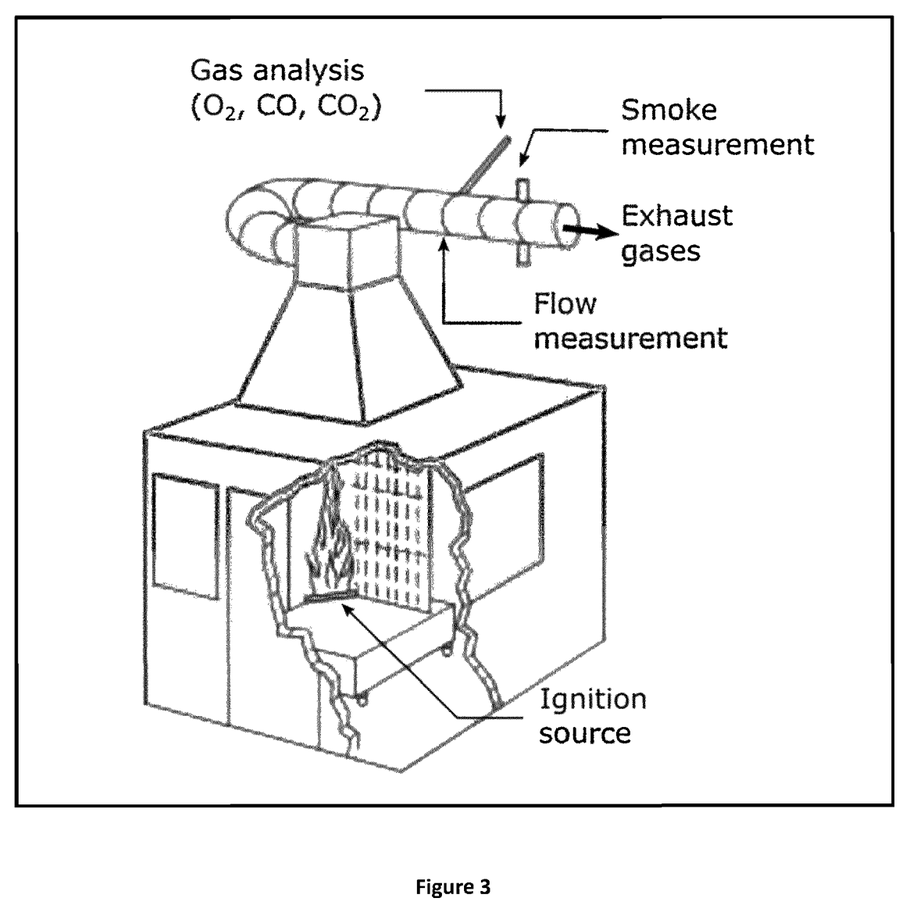
FIG. 3 is a schematic of the SBI test set-up of EN13823.

A schematic of the SBI test set-up of EN13823 is shown in FIG. 3. The test samples consist of two walls (formed of the material to be tested) mounted to form a vertical 90° corner. The dimensions of the walls are as follows:

Short wall—1.5 m high by 0.5 m long
Long wall—1.5 m high by 1.0 m long

A propane burner is positioned in the base of the corner formed by the specimen, with a horizontal separation of 40 mm between the edge of the burner and the lower edge of the specimen.

The rate of air flow extraction is set at 0.6 m³/s. A sampling probe is installed in the extraction duct, to measure the concentration of $CO_x$ and $O_2$ of the fire effluent gases passing through. The rate of heat release is continuously calculated by means of measuring oxygen consumption as set out in EN13823. The obscuration of light caused by the smoke in the fire effluent passing through the exhaust duct is determined by a white light lamp and photocell system.

At the outset of the test procedure, baseline data (e.g. temperature at various points in the test set-up) are recorded for three minutes. The burner is then ignited and a 30 kW flame impinges upon the test specimen for 21 minutes. The performance of the specimen is evaluated over a period of 20 minutes.

Fire growth rate (FIGRA) indices are defined as the maximum of the quotient of the average heat release as a function of time:

$$FIGRA = (1000) \times \max. \frac{HRR_{av}(t)}{(t-300)}$$

FIGRA is the fire growth rate index, in watts per second;
$HRR_{av}(t)$ is the average of heat release rate for HRR(t) in kilowatts;
HRR(t) is the heat release rate of the specimen at time t, in kilowatts;
Max. [a(t)] is the maximum of a(t) within the given time period NOTE: As a consequence, specimens with an HRRav value of not more than 3 kW during the total test period or a THR value of not more than 0.2 MJ over the total test period, have a $FIGRA_{0.2\ MJ}$ equal to zero. Specimens with an $HRR_{av}$ value of not more than 3 kW during the total test period or a THR value of not more than 0.4 MJ over the total test period, have a $FIGRA_{0.4\ MJ}$ equal to zero.

The quotient is calculated only for that part of the exposure period in which threshold levels for $HRR_{av}$ and THR have been exceeded. If one or both threshold values of a FIGRA index are not exceeded during the exposure period, that FIGRA index is equal to zero. Two different THR-threshold values are used, resulting in $FIGRA_{0.2\ MJ}$ and $FIGRA_{0.4\ MJ}$. The moments in time that the threshold values are exceeded are defined as:

(a) First moment after t=300 s at which $HRR_{av}$>3 kW
(b) First moment after t=300 sat which THR>0.2 MJ and/or THR>0.4 MJ The total heat release (THR) is measured over the first 10 minutes ($THR_{600\ s}$) after ignition of the burner.

EN13823 defines smoke growth rate index (SMOGRA) as the maximum of the quotient for the average smoke production rate as a function of time. The quotient is calculated only for that part of the exposure period in which threshold levels of average smoke production rate $SPR_{av}$ and total smoke production rate TSP have been exceeded. If one or both threshold values are not exceeded during the exposure period, SMOGRA is equal to zero.

$$SMOGRA = (10000) \times \max. \frac{SPR_{av}(t)}{(t - 300)}$$

SMOGRA is the smoke growth rate index in square metres per square second;
$SPR_{av}(t)$ is the average smoke production rate SPR(t) of the specimen in square metres per second;
SPR(t) is the smoke production rate of the specimen, in square metres per second;
max.[a(t)] is the maximum of a(t) within the given time period;
TSP(t) is the total smoke production of the specimen in the first 600 s of the exposure period within 300≤t≤900 s (m2).
Note: As a consequence, specimens with a $SPR_{av}$ value of not more than 0.1 m²/s during the total test period or a TSP value of not more than 6 m² over the total test period have a SMOGRA value equal to zero.

The moments in time that the threshold values are exceeded are defined as:
(a) First moment after t=300 s at which $SPR_{av}$>0.1 m²/s
(b) When "t" is between 300 s to 1500 s, TSP(t)>6 m²

The SMOGRA index is determined during the full duration of the test. The total smoke production $TSP_{600}$ is measured over the first 10 minutes after burner ignition (i.e. between 300 and 900 seconds).

As outlined above, the SBI test is comparable to a waste-paper basket on fire in the corner of a room.

Examples of the fire performance of different commercial available foam insulation materials tested according EN13823 is given in Table 1.

Phenolic foams typically have the best fire rating of any foam insulation products. The fire retardancy of a foam will be impacted by the nature of the blowing agent used to expand the foam retained within the cells of the foam. As discussed above, the thermal insulating performance of a foam also depends significantly on the blowing agent, and the thermal conductivity thereof. Chlorofluorocarbons (CFCs) and hydrofluorocarbons (HFCs) represent a class of blowing agent with the highly desirable combination of low thermal conductivity and excellent fire performance. However, the use of such blowing agents is being phased out due to their negative environmental impact, in particular, their high ozone depletion potential and high global warming potential. Hydrocarbon blowing agents, which have low environmental impact, have been employed as a replacement blowing agent for CFCs and HFCs but hydrocarbons are inherently higher in thermal conductivity than CFCs or HFCs and they are also flammable. Over the last 10 years in particular, hydrofluoroolefins and chlorinated hydrofluoroolefins have emerged as a class of blowing agent with a combination of low thermal conductivity, good fire performance and low environmental impact.

Hydrofluoroolefins (HFOs) and hydrochlorofluoroolefins (HCFOs) are unsaturated short-chain haloolefins, which have been introduced as alternatives to saturated hydrofluorocarbons (HFCs) as foam blowing agents, due to their ultra-low GWP (Global Warming Potential) and zero ODP (Ozone Depletion Potential).

With the introduction of HFOs (hydrofluoroolefins), and hydrochlorofluoroolefins (HCFOs), a range of blowing agents is now available to improve fire performance. A key advantage of these particular blowing agents is their low thermal conductivity in the gas phase and favourable environmental performance.

HCFOs are also preferred as a blowing agent, due to their low thermal conductivity in the gas phase and their compatible solubility with phenolic resins.

TABLE 1

| FOAM TYPE | Compressive Strength (kPa) | Blowing Agent Used | Declared Lambda Value (W/m · K) | EN13823 (test performed with foam core, no facings) | | | | | EN 11925-2 Burner impinges on foam for 15 seconds (mm) | Euroclass |
|---|---|---|---|---|---|---|---|---|---|---|
| | | | | FIGRA (0.2 MJ) (W/s) | FIGRA (0.4 MJ) (W/s) | THR (MJ) | SMOGRA (m²/s²) | TSP (m²) | | |
| XPS (high compressive strength) | 700 | unknown | 0.035 to 0.037 | | | | | | <150 | E |
| XPS (low compressive strength) | 200 | unknown | 0.033 to 0.037 | | | | | | >150 | F |
| PIR (1) | 150 | Cyclopentane/isopentane | 0.022 | 697 | 298 | 4.75 | 61 | 62 | <150 | D |
| PIR (2) | 150 | Cyclopentane/isopentane | 0.022 | 736 | 348 | 5.36 | 47 | 67 | <150 | D |
| PIR (3) | 150 | HCFO-1233zd(Z) | 0.019 | 1102 | 815 | 5.20 | 46 | 46 | <150 | E |
| Phenolic | 100 | Isopropyl chloride/isopentane | 0.020 | 232 | 128 | 4.4 | 1 | 40 | <150 | C |

Note:
To test the fire performance of the foam core, the facer is removed and the surface is sanded to remove any remaining facer materials, which can influence the test. The boards are mounted in line with the test standard EN 15715 to the incombustible substrate prior to testing.

Before the test on the foam core, the facer was peeled from the foam surface as carefully as possible. Any remaining facer is removed carefully by sanding with a very fine abrasive paper.

HFOs tend to have slightly higher thermal conductivity values in the gas phase than HCFOs.

Table 2 below gives an overview of the main blowing agents referred to in this patent.

TABLE 2

| Commercial name/IUPAC name | MW (g/mol) | BP ° C. | vapour pressure (bar, 20° C.) | Thermal Conductivity (mW/m · K) at 25° C. | dipole moment (D) | solubility in water (g/kg) | Flammability | ODP | GWP |
|---|---|---|---|---|---|---|---|---|---|
| Hydro(chloro) fluoroolefins | | | | | | | | | |
| HCFO-1224yd(Z) | 148 | 14 | 1.51* | 12.2 | | 0.34 | none | 0 | <1 |
| (Z)-1-Chloro-2,3,3,3,-Tetrafluoro-propene | | | | | | | | | |
| HFO-1336mzz(Z) | 164 | 33 | 0.72 | 10.7 | 3.19 | 3.8 | none | 0 | 5 |
| cis-1,1,1,4,4,4-hexafluoro-2-butene | | | | | | | | | |
| HFO-1336mzz(E) | 164 | 7.5 | 2 | 11.5 | | | | 0 | 7 |
| (E)-1,1,1,4,4,4-Hexafluoro-2-butene | | | | | | | | | |
| HCFO-1233zd(E) | 131 | 19 | 1.06 | 10.2 | 1.44 | 1.9 | none | 0 | 5 |
| trans-1-chloro-3,3,3-trifluoropropene | | | | | | | | | |
| HFO-1234ze(E) | 114 | −19 | 4.9 | 13 | 1.44 | 0.037 | none | 0 | 6 |
| trans-1,3,3,3-tetrafluoro-propene | | | | | | | | | |
| HFO-1234yf | 114 | −30 | 6.1 | 14 | 2.54 | 0.2 | yes | 0 | 4 |
| 2,3,3,3-tetrafluoro-propene | | | | | | | | | |
| Perfluorochemicals | | | | | | | | | |
| Perfluoro(4-methyl-2-pentene) | 300 | 49 | 0.355 | | | | none | 0 | |
| Perfluoro(4-methyl-2-pentene) | | | | | | | | | |
| Perfluoropropene | 150 | −28 | 6.3 | | 0 | | none | 0 | 0.25 |
| Hexafluoro-propene | | | | | | | | | |
| Perfluoroethylene | 100 | −76.3 | 32.4 | | | | yes | 0 | 0.02 |
| Tetrafluoro-ethene | | | | | | | | | |
| Perfluoro-1,3-butadiene | 162 | 6 | 0.8 | | 0 | | yes | 0 | 0.03 |
| Hexafluoro-1,3-butadiene | | | | | | | | | |
| Perfluorocyclo-hexene | 262 | 52 | | | | | | 0 | |
| Decafluoro-cyclohexene | | | | | | | | | |
| Perfluorobenzene | 186 | 80.1 | 0.11 | | | | high | 0 | |
| Hexafluorobenzene | | | | | | | | | |
| Chlorofluorocarbons | | | | | | | | | |
| CFC-11 | 137 | 23.7 | 0.883 | 8.2 | 4.1 | 1.1 | none | 1 | 4750 |
| trichlorofluoromethane | | | | | | | | | |
| hydrochlorofluorocarbons | | | | | | | | | |
| HCFC-141b | 117 | 32.2 | 0.69 | 9.8 | 4.32 | 4 | none | 0.1 | 725 |
| 1,1-dichloro-1-fluoroethane | | | | | | | | | |
| Hydrofluorocarbons | | | | | | | | | |
| HFC-134a | 102 | −26.2 | 4.826 | 12 | 2.06 | 1.5 | none | 0 | 1430 |
| 1,1,1,2-tetrafluoroethane | | | | | | | | | |
| HFC-143a | 84 | −47.6 | >10 | 74.7 | 2.34 | 0.76 | yes | 0 | 4470 |
| 1,1,1-trifluoroethane | | | | | | | | | |
| HFC-245fa | 134 | 15.3 | 1.227 | 12.2 | 1.57 | 7.18 | none | 0 | 1030 |
| 1,1,1,3,3-pentafluoropropane | | | | | | | | | |
| HFC-152a | 66 | −24.7 | 5.13 | 18.2 | 2.26 | 0.29 | yes | 0 | 124 |
| 1,1-difluoroethane | | | | | | | | | |
| Hydrocarbons | | | | | | | | | |
| Isopentane | 72 | 27.8 | 0.99 | 14.5 | 0 | 0 | yes | 0 | 5 |
| Methylbutane | | | | | | | | | |
| Cyclopentane | 70 | 49.3 | 0.338 | 12 | 0 | 0 | yes | 0 | <0.1 |
| Cyclopentane | | | | | | | | | |
| Isobutane | 58 | −12 | 3.1 | 14.3 | 0 | 0.05 | yes | 0 | 3 |
| Methylpropane | | | | | | | | | |
| n-pentane | 72 | 36 | 0.648 | 14.4 | 0.01 | 0 | yes | 0 | <15 |
| n-Pentane | | | | | | | | | |
| n-hexane | 86 | 68.5 | 0.18 | 23.4 | 0 | 0.01 | yes | 0 | 3 |
| n-Hexane | | | | | | | | | |
| Neohexane | 86 | 49.7 | 0.37 | 18 | 0 | 0 | yes | 0 | |
| 2,2-Dimethylbutane | | | | | | | | | |
| Diisopropyl | 86 | 57.9 | 0.26 | 18.8 | 0 | 0 | yes | 0 | |
| 2,3-Dimethylbutane | | | | | | | | | |

When considering what blowing agent to use when manufacturing a foam, the end use application of the foam must be taken into consideration, and in general, the properties of the blowing agent must align with the end use application. Important properties of a given blowing agent which may be considered during the selection process include: the thermal conductivity in the gas phase, the boiling point, compatibility with the chemical matrix, flammability, toxicity and price.

One of the most important criteria is the thermal conductivity (or lambda) of each blowing agent component (comp). A simple model to estimate the thermal conductivity of a binary gas mixture containing component A and component B is:

$$\lambda_{mix} = 0.5 * \frac{\lambda_{compA} * \lambda_{compB}}{\lambda_{compA} * X_{compB} + \lambda_{compB} X_{compA}} +$$
$$0.5 * (\lambda_{compA} * X_{compA} + \lambda_{compB} X_{compB})$$

where:
$\lambda_{mix}$ is the thermal conductivity of the mixture of the blowing agent components A and B
$\lambda_{comp\ A}$ is the thermal conductivity of blowing agent component A
$\lambda_{comp\ B}$ is the thermal conductivity of blowing agent component B
$X_{comp\ A}$ is weight fraction of component A in the blowing agent mixture
$X_{comp\ B}$ is weight fraction of component B in the blowing agent mixture.

This model can also be used to estimate the thermal conductivities of more complex blowing agent mixtures by initially calculating the thermal conductivity of two components in a blend of blowing agents and then employing the $\lambda_{mix}$ for the binary blend as a lambda input value for the mixture of the binary blend with a third blowing agent.

The cell gas inside a foam cell can start to condense when the foam temperature is at or below the boiling point of the blowing agent. The standard average temperature ($T_{mean}$) for lambda measurement of a foam according to the European standard EN 12667 for example is 10° C. In the heat flow meter, the temperature settings of the plates are 10° C. above and below this $T_{mean}$. The point at which the cell gas starts to condense will have an important impact on the thermal conductivity of the product.

Figure 4:
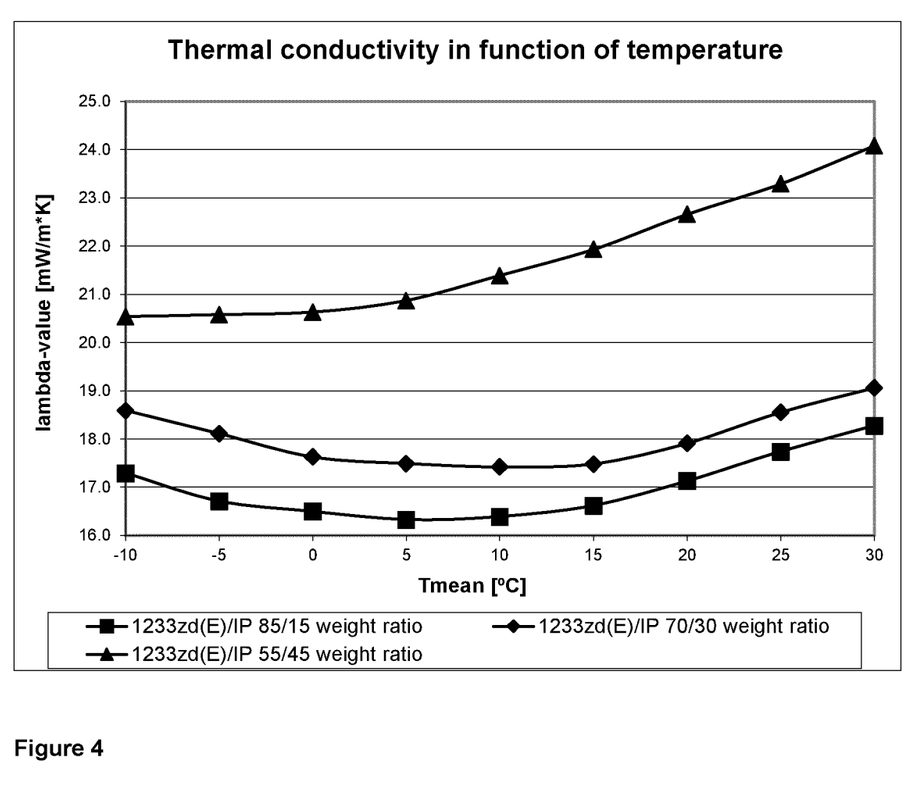
FIG. 4 shows the impact of temperature on the thermal conductivity (lambda λ value) of phenolic foams blown with three different weight ratio blends of 1-chloro-3,3,3-trifluoropropene (HCFO-1233zd) and isopentane.

FIG. 4 shows the impact of the temperature on the thermal conductivity of phenolic foams blown with three different weight ratio blends of 1-chloro-3,3,3-trifluoropropene (HCFO-1233zd) and isopentane.

Blowing agents are generally selected to try to avoid condensation above 10° C. in order to prevent condensation in the cells of the foam when in use. Condensation causes a reduction in insulation performance.

Blowing agents can also be categorized in terms of flammability. ISO817 classifies blowing agents in terms of their flammability.

TABLE 3

| Class | Category | Examples |
|---|---|---|
| 1 | Non-flammable | HFO-1336mzz(Z) |
|  |  | HCFO-1233zd(E) |

TABLE 3-continued

| Class | Category | Examples |
|---|---|---|
| 2L | Low flammability | HFO-1234yf |
|  |  | HCFO-1234ze(E) |
|  |  | H FC-32 |
| 2 | Flammable | HFC-152a |
| 3 | High flammability | Propane |
|  |  | Butane |
|  |  | pentane |

There are several main parameters that characterize the level of flammability (1, 2L, 2, and 3) of a blowing agent including the burning velocity (BV), the upper and lower flammability limits (UFL and LFL), the minimum ignition energy (MIE), and the heat of combustion (HOC):

1) BV, burning velocity: is the speed at which a flame propagates.
2) LFL, lower flammability limit: is the minimum concentration of a gas or vapour that is capable of propagating a flame within a homogenous mixture of that gas or vapour and air.
3) UFL, upper flammability limit: is the maximum concentration of a gas or vapour that is capable of propagating a flame within a homogenous mixture of that gas or vapour and air.
4) MIE, minimum ignition energy: indicates how much energy must be in an ignition source (e.g. spark or naked flame) to initiate ignition of a gas or vapour.
5) HOC, heat of combustion: is the energy released as heat when a specific amount of a substance undergoes complete combustion under standard conditions.

A class 3 blowing agent, will have an LFL which is significantly lower and a BV which is significantly higher than those of a class 2L blowing agent. The use of HCFOs and HFOs as blowing agents in phenolic foam should therefore facilitate the manufacture of insulation products having excellent fire performance. The present inventors have found that surprisingly this is not the case.

The present inventors prepared and investigated the fire performance and thermal conductivity of various blowing agents in phenolic foam and found a unique ternary combination of blowing agents which may be used to form thermal insulating phenolic foam having surprisingly excellent thermal conductivity values and fire performance.

Resin Preparation
Resin A

To a reaction vessel was added on a weight basis (pbw=parts by weight) 50.0 pbw phenol, 1 to 4 pbw water and 0.9±0.2 pbw of 50% potassium hydroxide at 20° C. The temperature was raised to 70 to 76° C. and 35±2 pbw of 91% paraformaldehyde was added slowly over 1 to 3 hours to dissipate the heat of the reaction exotherm. The temperature was then raised to, and maintained in the range of from 82 to 85° C. until the viscosity of the resin reached 7,500 mPa·s+/−1500 mPa·s. Cooling was commenced whilst adding 0.3 pbw of 90% formic acid to neutralize pH. Once the temperature dropped to below 50° C., the following items were sequentially added: 2 to 6 pbw polyol plasticiser, 3 to 6 pbw of urea and 2 to 5 pbw of ethoxylated castor oil (surfactant). The resulting phenolic resin composition contained 10 to 13 wt % water, less than 4 wt % free phenol, and less than 1 wt % free formaldehyde.

Phenolic Foam Preparation

A general procedure for the manufacture of phenolic foam boards is described in Comparative Example (CE) 1 below.

Comparative Example 1 (CE 1)—Blowing Agent (BA) is Isopropyl Chloride:Isopentane (iPC:iP 80+/−5:20+/−5 by Weight)

To 110+/−5 pbw of resin A at 15-19° C. was added with mixing at 300+/−100 rpm 5+/−2 pbw of calcium carbonate until calcium carbonate is uniformly dispersed. The said blended resin mix is pumped to a high speed mixer where 9+/−3 pbw of iPC:iP blowing agent at 1 to 3° C. and 20+/−3 pbw of 2:1 ratio toluene sulfonic acid:xylene sulfonic acid catalyst at 8 to 15° C. is quickly mixed into the resin blend. High speed mixing at 1000 to 3000 rpm is used to achieve intimate mixing so that a foamable composition is produced. Then said foaming resin composition was discharged to a suitable facing such as non-woven glass mat at a predetermined foamable resin flow rate to give the desired final foam cured density such as 35 kg/m³, at the desired foam thickness such as 20 to 150 mm. Then the foamable mixture is carried by a running horizontal conveyor belt into a conventional slat-type double conveyor foam lamination machine. The oven may have a uniform temperature such as 70° C. or may include several different temperature zones. Just before entering the foam lamination machine, a top facing is then introduced on to the foaming resin composition. The moving foam material passes through the heated oven press where the rising foam is pressurised at 40 to 50 kPa at a fixed gap to give the required foam board thickness. The foam expansion and initial curing in the oven press is for between 4 and 15 minutes. The partially cured foam that exits from the lamination machine is cut to a required length. The foam board is then placed in a secondary oven at 70° C. to 90° C. until fully cured. Table 4 gives details of a foam board manufactured using such a method.

TABLE 4

|  | CE 1 IPC:IP (80:20) |
|---|---|
| Phenolic Resin | 111 |
| Acid Catalyst | 21 |
| isopropyl chloride | 7.6 |
| isopentane | 1.9 |
| Sample thickness (mm) | 84 |
| Initial lambda (W/m-K) | 0.0182 |
| 110° C. aged 2 weeks lambda (W/m-K) | 0.0189 |
| Foam density Kg/m3 | 35.8 |
| Foam stable water content % | 3.7 |
| Compressive strength at first crack (kPa) | 120 |
| FIGRA 0.2 MJ (W/s) | 232 |
| FIGRA 0.4 MJ (W/s) | 128 |
| THR t = 600 s (MJ) | 4.4 |
| SMOGRA (m²/s²) | 1 |
| TSP t = 600 s (m²) | 40 |

Comparative Example 2 (CE2)—Blowing Agent is HCFO-1233zd (E)

Here the same procedure as was used as outlined in Comparative Example 1 except the blowing agent was changed to 14.8 parts by weight of HCFO-1233zd (E) blowing agent at 1 to 3° C. The foam board produced had a density of 35.6 kg/m³.

Comparative Example 3—Blowing Agent is HCFO-1233zd (E):IP (70:30)

Same as CE2 except the blowing agent is 8.47 pbw of HCFO-1233zd(E) and 3.63 pbw of isopentane.

Comparative Example 4—Blowing Agent is HCFO-1233zd (E):HFO-1336mzz (Z) (95:5)

Same as CE2 except that the blowing agent is 13.18 pbw HCFO-1233zd(E) and 0.76 pbw HFO-1336mzz (Z).

Comparative Example 5—Blowing Agent is HCFO-1233zd (E):HFO-1336mzz (Z):isopentane (65:5:30)

Same as CE2 except that the blowing agent is 7.5 pbw of HCFO-1233zd (E), 0.58 pbw of HFO-1366mzz (Z) and 3.47 pbw of isopentane.

TABLE 5

|  | CE2 HCFO:HFO:HC (100:0:0) | CE3 HCFO:HFO:HC (70:0:30) | CE4 HCFO :HFO: HC (95:5:0) | CE5 HCFO:HFO: HC (65:5:30) |
|---|---|---|---|---|
| Phenolic Resin (pbw) | 111 | 111 | 111 | 111 |
| Acid Catalyst (pbw) | 21 | 21 | 21 | 21 |
| HCFO-1233zd E (pbw) | 14.8 | 8.47 | 14.4 | 7.5 |
| HFO-1366mzz (pbw) | 0 | 0 | 0.76 | 0.58 |
| isopentane (pbw) | 0 | 3.63 | 0 | 3.47 |
| Sample thickness (mm) | 84 | 84 | 84 | 84 |
| Initial lambda (W/m.K) | 0.0160 | 0.0176 | 0.0159 | 0.0177 |
| 110° C. aged 2 weeks lambda (W/m.K) | 0.0168 | 0.0189 | 0.0166 | 0.0187 |
| Foam density Kg/m3 | 36.6 | 36.2 | 36.5 | 35.9 |
| Foam stable water content % | 3.8 | 3.7 | 4.1 | 4.2 |
| Compressive strength first crack (kPa) | 112 | 135 | 119 | 135 |
| FIGRA 0.2 MJ (W/s) | 394 | 237 | 272 | 157 |
| FIGRA 0.4 MJ (W/s) | 394 | 237 | 272 | 85 |
| THR t = 600 s (MJ) | 15.64 | 16.06 | 17.72 | 4.65 |
| SMOGRA (m²/s²) | 30.3 | 16.3 | 19.9 | 4.1 |
| TSP t = 600 s (m²) | 112 | 88 | 114 | 55 |

Example 1—Blowing Agent is HCFO-1233zd (E):HFO-1336mzz (Z):IP (90:5:5)

Same as CE5 except that the blowing agent was 13.18 parts of HCFO-1233zd (E), 0.73 parts of HFO-1366mzz (Z) and 0.73 parts of isopentane.

Example 2—Blowing Agent is HCFO-1233zd (E):HFO-1336mzz (Z):IP (85:5:10)

Same as CE5 except that the blowing agent was 11.87 pbw of HCFO-1233zd (E), 0.70 pbw of HFO-1366mzz (Z) and 1.4 pbw of isopentane.

Example 3—Blowing Agent is HCFO-1233zd (E):HFO-1336mzz (Z):IP (80:5:15)

Same as CE5 except that the blowing agent was 10.55 pbw of HCFO-1233zd (E), 0.66 pbw of HFO-1366mzz (Z) and 1.98 pbw of isopentane.

Example 4—BA=HCFO-1233zd (E):HFO-1336mzz (Z):IP (75:5:20)

Same as CE5 except that the blowing agent was 9.3 pbw of HCFO-1233zd (E), 0.62 pbw of HFO-1366mzz (Z) and 2.48 pbw of isopentane.

Example 5—BA=HCFO-1233zd (E):HFO-1336mzz (Z):IP (85:10:5)

Same as CE5 except that the blowing agent was 12.4 pbw of HCFO-1233zd (E), 1.46 pbw of HFO-1366mzz (Z) and 0.73 pbw of isopentane.

Example 6—BA=HCFO-1233zd (E):HFO-1336mzz (Z):IP (80:10:10)

Same as CE5 except that the blowing agent was 11.1 pbw of HCFO-1233zd (E), 1.40 pbw of HFO-1366mzz (Z) and 1.4 pbw of isopentane.

Example 7—BA=HCFO-1233zd (E):HFO-1336mzz (Z):IP (75:10:15)

Same as CE5 except that the blowing agent was 9.39 pbw of HCFO-1233zd (E), 1.26 pbw of HFO-1366mzz (Z) and 1.88 pbw of isopentane.

TABLE 6

|  | E1 HCFO:HFO:HC (90:5:5) | E2 HCFO:HFO:HC (85:5:10) | E3 HCFO:HFO:HC (80:5:10) | E4 HCFO:HFO:HC (75:5:20) |
|---|---|---|---|---|
| Phenolic Resin (pbw) | 111 | 111 | 111 | 111 |
| Acid Catalyst (pbw) | 21 | 21 | 21 | 21 |
| HCFO-1233zd E (pbw) | 13.18 | 11.87 | 10.55 | 9.3 |
| HFO-1366mzz(Z) (pbw) | 0.73 | 0.7 | 0.66 | 0.62 |
| isopentane (pbw) | 0.73 | 1.4 | 1.98 | 2.48 |
| Sample thickness (mm) | 84 | 84 | 84 | 84 |
| Initial lambda (W/m · K) | 0.0161 | 0.016 | 0.0163 | 0.0175 |
| 110° C. aged 2 weeks lambda (W/m · K) | 0.0169 | 0.0168 | 0.0179 | 0.0180 |
| Foam density Kg/m3 | 36.5 | 36.7 | 36.4 | 36.6 |
| Foam stable water content % | 4.2 | 4 | 3.9 | 4.4 |
| Compressive strength first crack (kPa) | 132 | 145 | 127 | 140 |
| FIGRA 0.2 MJ (W/s) | 120 | 116 | 116 | 119 |
| FIGRA 0.4 MJ (W/s) | 68 | 67 | 70 | 76 |
| THR t = 600 s (MJ) | 5.12 | 4.98 | 5.42 | 5.19 |
| SMOGRA (m$^2$/s$^2$) | 2 | 0 | 1.7 | 3.6 |
| TSP t = 600 s (m$^2$) | 114 | 42 | 37 | 59 |

|  | E5 HCFO:HFO:HC (85:10:5) | E6 HCFO:HFO:HC (80:10:10) | E7 HCFO:HFO:HC (75:10:15) |
|---|---|---|---|
| Phenolic Resin (pbw) | 111 | 111 | 111 |
| Acid Catalyst (pbw) | 21 | 21 | 21 |
| HCFO-1233zd E (pbw) | 12.4 | 11.1 | 9.39 |
| HFO-1366mzz(Z) (pbw) | 1.46 | 1.4 | 1.26 |
| isopentane (pbw) | 0.73 | 1.4 | 1.88 |
| Sample thickness (mm) | 84 | 84 | 100 |
| Initial lambda (W/m · K) | 0.0167 | 0.0165 | 0.0168 |
| 110° C. aged 2 weeks lambda (W/m · K) | 0.0175 | 0.0172 | 0.0177 |
| Foam density Kg/m3 | 36.3 | 36.6 | 36.4 |
| Foam stable water content % | 3.9 | 3.8 | 3.6 |
| Compressive strength first crack (kPa) | 142 | 138 | 148 |

TABLE 6-continued

| | | | |
|---|---|---|---|
| FIGRA 0.2 MJ (W/s) | 109 | 84 | 95 |
| FIGRA 0.4 MJ (W/s) | 66 | 51 | 60 |
| THR t = 600 s (MJ) | 5.1 | 4.2 | 6.08 |
| SMOGRA (m$^2$/s$^2$) | 3.7 | 1.8 | 4.8 |
| TSP t = 600 s (m$^2$) | 61 | 50 | 66 |

Example 8—BA=HCFO-1233zd (E):HFO-1336mzz (Z):HFO-1336mzz (E) IP (90:3.5:1.5:5)

Same as Ex1 except that the blowing agent was 13.18 pbw of HCFO-1233zd (E), 0.51 pbw of HFO-1366mzz (Z), 0.22 pbw of HFO-1366mzz (E), and 1.88 pbw of isopentane and foam thickness is 50 mm.

Example 9—BA=HCFO-1233zd (E):HFO-1336mzz (Z):HFO-1336mzz (E) IP (80:10.5:4.5:5)

Same as Ex6 except that the blowing agent was 11.1 pbw of HCFO-1233zd (E), 1.46 pbw of HFO-1366mzz (Z), 0.62 pbw of HFO-1366mzz (E), and 0.69 pbw of isopentane and foam thickness is 50 mm.

Comparative Example 6 (CE6)—BA=HCFO-1233zd (E):HFO-1336mzz (Z):HFO-1336mzz (E) IP (80:10.5:4.5:0)

Same as Ex6 except that the blowing agent was 11.1 pbw of HCFO-1233zd (E), 1.94 pbw of FO-1366mzz (Z), 0.83 pbw of HFO-1366mzz (E), and ZERO pbw of isopentane and foam thickness is 50 mm.

TABLE 7

| | HCFO/HFO (1)/HFO (2)/HC Blends | Peak Heat Release Rates (PHRR's) kW/m2 | Total Heat Release Rate (THRR) kW/m$^2$ | Foam Thickness (mm) |
|---|---|---|---|---|
| Ex 8 | 90/3.5/1.5/5/by weight 90 HCFO 1233zd(E) 3.5 HFO-1336mzz(Z) 1.5 HFO-1336mzz(E) 5.0 isopentane (IP) | 37.2 | 15.9 | 50 |
| Ex 9 | 80/10.5/4.5/5 by weight 80 HCFO 1233zd(E) 10.5 HFO-1336mzz(Z) 4.5 HFO-1336mzz(E) 5.0 Isopentane (IP) | 40.7 | 18.3 | 50 |
| CE 6 | 80/14/6/0 by weight 80 HCFO 1233zd(E) 14. HFO-1336mzz(Z) 6 HFO-1336mzz(E) 0 Isopentane | 54.7 | 24.5 | 50 |

Discussion of Comparative Examples and Examples

The physical properties and fire performance of the foams of the comparative examples and examples are illustrated in Tables 4, 5, 6 and 7.

The blowing agent in CE1 is a blend of isopropyl chloride and isopentane, in an 80:20 ratio blend by weight. CE1 exhibits good initial and aged thermal conductivity, and the fire performance classifies the foam of CE1 as a Euroclass C product.

The blowing agent in CE2 is entirely HCFO-1233zd (a non-flammable class 1 blowing agent in accordance with ISO817). The initial and aged thermal conductivity of CE2 are excellent, however, the fire performance of CE2 is inferior to what would be expected when using a non-flammable blowing agent. High FIGRA 0.2 MJ and FIGRA 0.4 MJ values were observed when a foam board of CE2 was assessed in BS EN 13823. Accordingly, despite the use of a non-flammable blowing agent, the fire performance of CE2 is worse than that of CE1 which comprises flammable isopentane. CE2 is classified as a Euroclass D product.

CE3 comprises a blowing agent blend of HCFO-1233zd and isopentane, and exhibits good initial and aged thermal conductivity values, and an improvement in fire performance in comparison to CE2, however, despite this improvement CE3 is classified as a Euroclass C product.

CE4 comprises a blowing agent blend of HCFO-1233zd and HFO-1336mzz(Z). HFO-1336mzz(Z) is also classified as a non-flammable Class 1 blowing agent in accordance with ISO817. The initial and aged thermal conductivity values of CE4 are excellent. However, the FIGRA 0.2 MJ and FIGRA 0.4 MJ values are greater than those observed for CE3.

CE5 comprises a ternary blowing agent blend of HCFO-1233zd, HFO-1336mzz(Z) and isopentane. Despite the inclusion of highly flammable isopentane, the desired low initial and aged thermal conductivity values remain almost constant good, but significantly, there is a dramatic improvement in the fire performance, albeit the FIGRA 0.2 MJ value remains above 150 W/s.

In contrast, E1 to E7 demonstrate that a FIGRA 0.2 MJ value of less than 150 W/s can be achieved when a specific ternary blend of a chlorinated hydrofluoroolefin, a hydrofluoroolefin and a hydrocarbon is employed, without deleteriously impacting the low thermal conductivity of the foam. Indeed, each of E1 to E7 demonstrate a FIGRA 0.2 MJ value of less than 120 W/s, and are classified as Euroclass B products.

Importantly, the blowing agent used to form the phenolic foams of the invention comprises at least one chlorinated hydrofluoroolefin, at least one hydrofluoroolefin and at least one $C_3$-$C_6$ hydrocarbon, wherein the at least one chlorinated hydrofluoroolefin is present in an amount of from about 65 wt % to 92 wt % based on the total weight of the blowing agent, the hydrofluoroolefin is present in an amount of from about 3 to 20 wt % based on the total weight of the blowing agent and the at least one $C_3$-$C_6$ hydrocarbon is present in an amount of from 5 to 25 wt % based on the total weight of the blowing agent.

As evidenced by CE5 if the amount of hydrocarbon exceeds about 25 wt %, the fire performance of the foam will be negatively impacted, and the attainment of a Euroclass B foam is not possible. Furthermore, as evidenced by CE2 and CE4, if less than about 5 wt % hydrocarbon is present, the fire performance is also deleteriously impacted.

If less than about 3 wt % hydrofluoroolefin is present the fire performance of the product suffers, and if greater than about 20 wt % hydrofluoroolefin is present, the thermal conductivity of the foam product increases.

Accordingly, optimal thermal insulation performance and fire performance is achieved, when the blowing agent comprises the aforementioned ternary blend.

As outlined above, the at least one chlorinated hydrofluoroolefin is present in an amount of from about 65 wt % to about 92 wt % based on the total weight of the blowing agent used to form the phenolic foam of the present invention. Preferably, the chlorinated hydrofluoroolefin is present in an amount of from about 72 wt % to about 92 wt % based on the total weight of the blowing agent. More preferably, the chlorinated hydrofluoroolefin is present in an amount of from about 72 wt % to about 88 wt % based on the total weight of the blowing agent, even more preferably the chlorinated hydrofluoroolefin is present in an amount from about 72 wt % to about 82 wt % based on the total weight of the blowing agent.

The at least one hydrofluoroolefin is present in an amount of from about 3 wt % to about 20 wt % based on the total weight of the blowing agent used to form the phenolic foam of the present invention. Preferably, the hydrofluoroolefin is present in an amount of from about 5 wt % to about 15 wt %, such as from about 8 wt % to about 14 wt % based on the total weight of the blowing agent.

The $C_3$-$C_6$ hydrocarbon is present in an amount of from about 5 wt % to about 25 wt % based on the total weight of the blowing agent used to form the phenolic foam of the present invention. Preferably, the $C_3$-$C_6$ hydrocarbon is present in an amount of from about 5 wt % to about 22 wt %, such as from about 8 wt % to about 18 wt % based on the total weight of the blowing agent.

Suitably, the chlorinated hydrofluoroolefin is selected from HCFO-1233zd and HCFO-1224yd.

The chlorinated hydrofluoroolefin may be HCFO-1233zd-(E) and/or HCFO-1233zd-(Z). For example, the 1233zd may be at least 90 wt % of the E-isomer (HCFO-1233zd-(E)), such as at least 95 wt % of the E-isomer (HCFO-1233zd-(E)).

The hydrofluoroolefin is suitably HFO-1336mzz. The HFO-1336mzz may be HFO-1336mzz-(Z) and/or HFO-1336mzz-(E). For example, the HFO-1336mzz may be at least 90 wt % of the Z-isomer (HFO-1336mzz-(Z)), such as at least 95 wt % of the Z-isomer (HFO-1336mzz-(Z)).

Suitably, the $C_3$-$C_6$ hydrocarbon is a propane, butane, pentane, hexane or isomer thereof. More suitably, the $C_3$-$C_6$ hydrocarbon comprises a butane and/or a pentane. Preferably, the butane comprises isobutane. Preferably, the pentane comprises isopentane.

Advantageously, each of the foams of Examples 1 to 7 demonstrate stable low thermal conductivity over extended time and temperature exposure, and excellent fire performance. Each of the foams of examples 1 to 7 are Euroclass B products.

Examples 8 and 9 which contain HCFO-1233zd, HFO-1336mzz(Z)/HFO-1336mzz(E) and flammable isopentane have shown in Cone calorimetry tests that there is a surprising reduction in Peak Heat Release Rates (PHRR's) and Total Heat Release Rate (THRR) kW/m² compared to CE6 which does not contain any flammable isopentane.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A phenolic foam comprising a phenolic resin comprising a plurality of cells, said plurality of cells comprising a blowing agent comprising:
at least one hydrofluoroolefin and at least one chlorinated hydrofluoroolefin;
and said blowing agent further comprising at least one $C_3$-$C_6$ hydrocarbon;
wherein said phenolic foam has a density of from 10 kg/m³ to 100 kg/m³, a closed cell content of at least 85% as determined in accordance with ASTM D6226 and wherein said foam has a $FIGRA_{0.2\ MJ}$ of 150 W/s or less, when measured according to EN13823.

2. The phenolic foam according to claim 1, wherein said phenolic foam has a $FIGRA_{0.2\ MJ}$ of 125 W/s or less, when measured according to EN13823.

3. A phenolic foam comprising a phenolic resin comprising a plurality of cells, said plurality of cells comprising a blowing agent comprising at least one chlorinated hydrofluoroolefin and at least one hydrofluoroolefin, and at least one $C_3$-$C_6$ hydrocarbon, wherein said phenolic foam has a density of from 10 kg/m³ to 100 kg/m³, a closed cell content of at least 85% as determined in accordance with ASTM D6226 and wherein said phenolic foam has a $FIGRA_{0.4\ MJ}$ of 80 W/s or less, when measured according to EN13823.

4. The phenolic foam according to claim 1, wherein said phenolic foam has a $FIGRA_{0.4\ MJ}$ of 80 W/s or less, when measured according to EN13823.

5. The phenolic foam according to claim 1, wherein said phenolic foam has a total heat release of 7.5 MJ or less, when measured according to EN13823.

6. The phenolic foam according to claim 1, wherein said phenolic foam has a closed cell content of 90% or more, as determined in accordance with ASTM D6226.

7. The phenolic foam according to claim 1, wherein the plurality of cells of the phenolic foam have an average cell diameter in the range of from 50 to 250 μm.

8. The phenolic foam according to claim 1, wherein said phenolic foam has a thermal conductivity of 0.020 W/m·K or less when measured at a mean temperature of 10° C., in accordance with EN 13166:2012.

9. The phenolic foam according to claim 1, said phenolic foam having a limiting oxygen index of 34% or more as determined in accordance with ISO 4589-2.

10. The phenolic foam according to claim 1, wherein said phenolic foam has a stable moisture content of from 3% to 5% by weight when determined at (23±2)° C. and a relative humidity of (50±5)% in accordance with EN1249:1998.

11. The phenolic foam according to claim 1, wherein the at least one chlorinated hydrofluoroolefin is selected from 1-chloro-3,3,3-trifluoropropene (HCFO-1233zd) and 1-chloro-2,3,3,3-tetrafluoropropene (HCFO-1224yd).

12. The phenolic foam according to claim 1, wherein the at least one hydrofluoroolefin comprises 1,1,1,4,4,4-hexafluoro-2-butene (HFO-1336mzz).

13. The phenolic foam according to claim 1, wherein the $C_3$-$C_6$ hydrocarbon comprises at least one butane and/or at least one pentane.

14. A phenolic foam formed by foaming and curing a phenolic resin foamable composition comprising a phenolic resin, a surfactant, an acid catalyst, and a blowing agent, said blowing agent comprising:

at least one hydrofluoroolefin and at least one chlorinated hydrofluoroolefin, and said blowing agent further comprising at least one $C_3$-$C_6$ hydrocarbon;

wherein said phenolic foam has a density of from 10 kg/m³ to 100 kg/m³, a closed cell content of at least 85% as determined in accordance with ASTM D6226 and wherein said phenolic foam has a FIGRA$_{0.2\ MJ}$ of 150 W/s or less when measured according to EN13823.

15. The phenolic foam according to claim 1, wherein the at least one chlorinated hydrofluoroolefin comprises 1-chloro-3,3,3-trifluoropropene and/or 1-chloro-2,3,3,3-tetrafluoropropene and the at least one hydrofluoroolefin comprises 1,1,1,4,4,4-hexafluoro-2-butene.

16. The phenolic foam according to claim 1, wherein the phenolic resin has a weight average molecular weight of from about 700 to about 2000, and/or wherein the phenolic resin has a number average molecular weight of from about 330 to about 800.

17. The phenolic foam according to claim 1, wherein the phenolic resin has a molar ratio of phenol groups to aldehyde groups in the range of from about 1:1 to about 1:3.

18. The phenolic foam according to claim 14, wherein the water content of the phenolic resin foamable composition is in the range of from about from 5 wt % to 12 wt % based on the total weight of the phenolic resin foamable composition.

19. The phenolic foam according to claim 1, wherein the phenolic resin has a water content in the range of from about 10 wt % to about 14 wt %.

20. The phenolic foam according to claim 1, wherein the phenolic resin has a viscosity of from about 2,500 mPa·s to about 18,000 mPa·s when measured at 25° C.

* * * * *

UNITED STATES PATENT AND TRADEMARK OFFICE
CERTIFICATE OF CORRECTION

PATENT NO. : 12,435,197 B2  
APPLICATION NO. : 17/794461  
DATED : October 7, 2025  
INVENTOR(S) : Samuel Butler et al.

Page 1 of 1

It is certified that error appears in the above-identified patent and that said Letters Patent is hereby corrected as shown below:

In the Specification

<u>Column 7</u>
Line 12      Delete "(±2°) C." and insert --(±2)° C.--

Signed and Sealed this  
Thirtieth Day of December, 2025

John A. Squires  
*Director of the United States Patent and Trademark Office*